United States Patent [19]
Zagoroff et al.

[11] Patent Number: 5,344,314
[45] Date of Patent: Sep. 6, 1994

[54] TURBINE DEVICE FOR HOT AIR GENERATION

[75] Inventors: Dimiter S. Zagoroff, Cambridge; Arnold M. Heitmann, Swampscott, both of Mass.

[73] Assignee: Shrinkfast Marketing, Newport, N.H.

[21] Appl. No.: 45,822

[22] Filed: Apr. 9, 1993

[51] Int. Cl.$^5$ .............................................. F24H 1/00
[52] U.S. Cl. ................................... 432/222; 431/158; 431/352; 34/96
[58] Field of Search ................ 432/222; 431/158, 352; 34/96, 97

[56] References Cited

U.S. PATENT DOCUMENTS

| | | | |
|---|---|---|---|
| Re. 28,665 | 12/1975 | Zagoroff | 431/347 |
| 3,525,218 | 8/1970 | Buss | 60/39.02 |
| 3,779,694 | 12/1973 | Zagoroff | 431/347 |
| 3,883,290 | 5/1975 | Windelbandt | 432/222 |
| 3,917,442 | 11/1975 | Zagoroff | 431/351 |
| 4,726,767 | 2/1988 | Nakajima | 432/222 |
| 5,009,592 | 4/1991 | Roldon et al. | 432/222 |

OTHER PUBLICATIONS

H. Cohen et al., *Gas Turbine Theory*, Chapters 1 and 2, Longmans, Green and Co. Publishers, pp. 1–5 and 14–21.

*Primary Examiner*—Carroll B. Dority
*Attorney, Agent, or Firm*—Hamilton, Brook, Smith & Reynolds

[57] ABSTRACT

The pressure head needed to drive combustion air into the combustion region (46) of a heat gun 930) is imparted to the air by a compressor blades (36) driven by a turbine whose blades (32) are interposed in the fuel conduit that leads to the combustion region (46). The expansion of the gaseous fuel, which is obtained from a pressurized source, provides the power to impose the necessary pressure head. The turbine-compressor combination is efficient enough that it can extract from the fuel flow enough power to maintain the necessary pressure head not only on the combustion gas ($A_1$), which flows through vents (44) in a manifold (43), but also on a larger volume of air ($A_2$) delivered downstream of the combustion region (46) to dilute the combustion products and thereby cool them to the desired heat-gun output temperature.

18 Claims, 4 Drawing Sheets

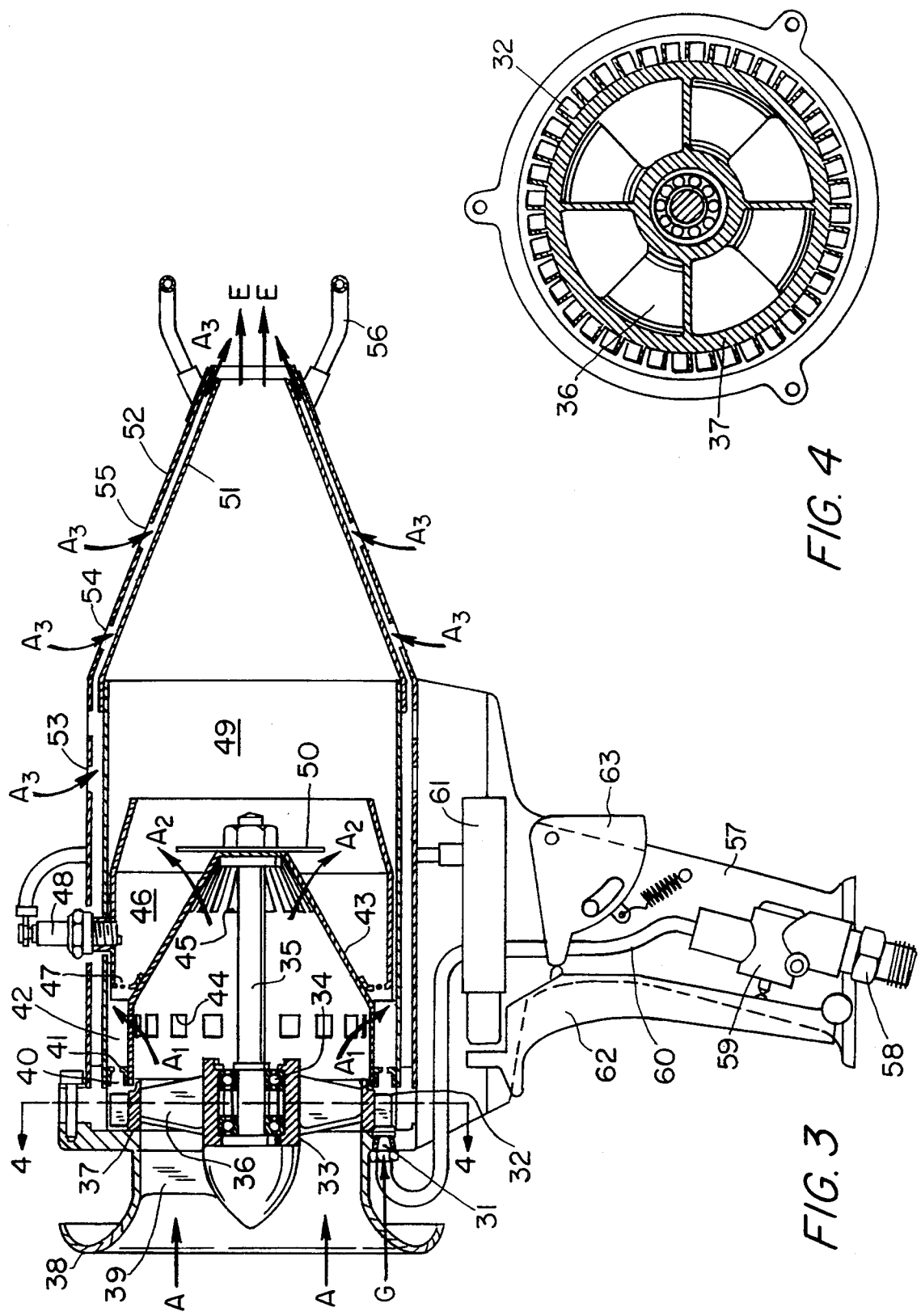

TURBINE DEVICE FOR HOT AIR GENERATION

BACKGROUND

The invention relates generally to heating devices that rely on the combustion of high pressure gaseous fuels such as liquid petroleum gases or high pressure natural gas, particularly where portability is important such as with a heat gun.

Numerous heating applications in home and in industry require a heat gun as a high velocity source of moderately hot air. For example, direct heating of objects in processes such as paint removal or shrink wrapping plastics require moderate temperature to avoid charring or overheating while high velocity enhances heat transfer.

A conventional heat gun relies on electrical fans to move the air heated by combustion of fuel gas. The drawback of these devices is the added weight of the electrical motors and inability to use these units in the field where electricity is not available.

A different, commercially highly successful heat gun is described in a previous patent of Zagoroff, a coinventor of the current invention, U.S. Pat. No. 3,779,694, HEAT GUN, granted Sep. 23, 1973. The fuel jet pressurizes combustion air in a jet pump, feeding the mixture into an internal combustor. In the combustor, the gases expand by the addition of heat of combustion and exit as a high velocity jet of exhaust gases at stoichiometric burning temperature of over 3000° F. and discharge velocities exceeding 4000 feet per minute. This jet entrains and propels copious amounts of ambient air in a second jet pump to create a blast of heated air at moderate temperatures. By virtue of the combustion at elevated pressure, a portion of the combustion energy of the fuel is converted to mechanical energy of the exhaust gases which augments the power available to pump air in the secondary jet pump.

SUMMARY OF THE INVENTION

The overall mechanical efficiency of the jet pump heat gun to move air suffers from the inherently low efficiency of the jet pump, typically less than 20%. The overall pumping efficiency of the two pumps in series is thus only 20%×20%=4%. Another drawback of the device is the great mixing lengths required for acceptable performance which increases the bulk of the device.

It is therefore an object of his invention to provide a heating device that relies on a gaseous fuel as the sole energy source and which is mechanically efficient in converting the heat and kinetic energy of the jet of gaseous fuel to a high speed jet of hot air.

Occasionally, gas turbines built for jet propulsion have been employed for emergency space heating in the field. In the conventional turbine cycle (see FIG. 1), the energy of the hot exhaust gases of the combustor is used partially to drive a turbine which powers the air compressor, and partially to create the jet of hot air for thrust. The blades of the turbine wheel have to withstand high temperatures and stresses which necessitates the use of exotic materials whose cost has precluded the widespread use of gas turbines for this application.

In accordance with the present invention, a gas heating device such as a heat gun comprises a prime mover such as a turbine which is driven by pressurized gas fuel. An air compressor is driven by the prime mover to compress air which is then mixed with the pressurized gas fuel and ignited in a combustor.

As in the case of the conventional gas turbine, the three main components are a compressor, a turbine and a combustion chamber, but they are linked together in a novel manner. As before, the compressor feeds combustion and excess air into the combustion chamber under pressure; the turbine, however, is not driven by the combustion products but by the expansion energy of the compressed fuel gas. The turbine blades are thus not exposed to any heat and can be made of inexpensive, low temperature materials.

Preferably, the compressor feeds both the combustion air necessary for combustion and excess air necessary to dilute the combustion products to the desired low temperature into the combustion chamber. Combustion and mixing of the excess air are carried out under constant pressure inside the combustion chamber, and the exhaust gases are expanded through an outlet nozzle.

In a preferred embodiment of the invention, the compressor further directs some of the compressed air to a downstream mixing region in which the air thus directed mixes with the combustion products. The compressor includes a manifold that forms upstream vents that provide fluid communication with the combustor upstream of the ignition region and downstream vents that provide fluid communication with the downstream mixing region. The upstream and downstream vents are sized relative to each other to direct more of the compressed air downstream of the ignition region than upstream thereof.

To maintain a cool exterior, a shroud may be provided about the combustion chamber with cooling air being drawn between the shroud and the combustion chamber. The cooling air may be aspirated by the exhaust gases directed through the exhaust nozzle.

Preferably, a circular rim is mounted on radially outward ends of compressor fan blades, and the turbine blades extend radially outward from the rim.

The invention is particularly applicable to a heat gun where the heating device is mounted to a handle but may also be implemented for other applications such as space heating.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is partially diagrammatic vertical cross-sectional view of a preferred embodiment of the present invention.

FIG. 4 is a cross-sectional view of the embodiment of FIG. 3 taken along line 4—4.

DETAILED DESCRIPTION OF PREFERRED EMBODIMENT

A novel feature of a heat gun of the present invention is the use of a gas driven turbine to compress and mix combustion air with the gas fuel rather than a jet pump. Emergency heating at remote locations has been provided by gas turbines built for jet propulsion. For reasons that can be appreciated by reference to FIG. 1, however, devices based on the conventional turbine cycle are too expensive for widespread heating use on a routine basis.

Figure 1:
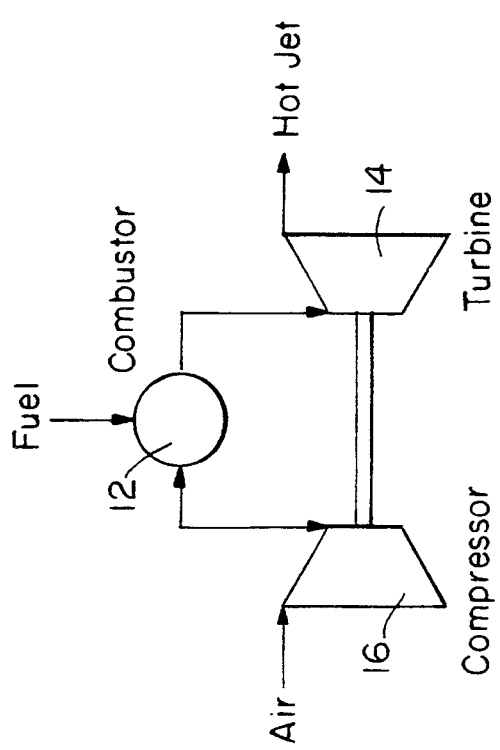
FIG. 1, is a schematic diagram that illustrates a conventional gas-turbine cycle.
Figure 5:
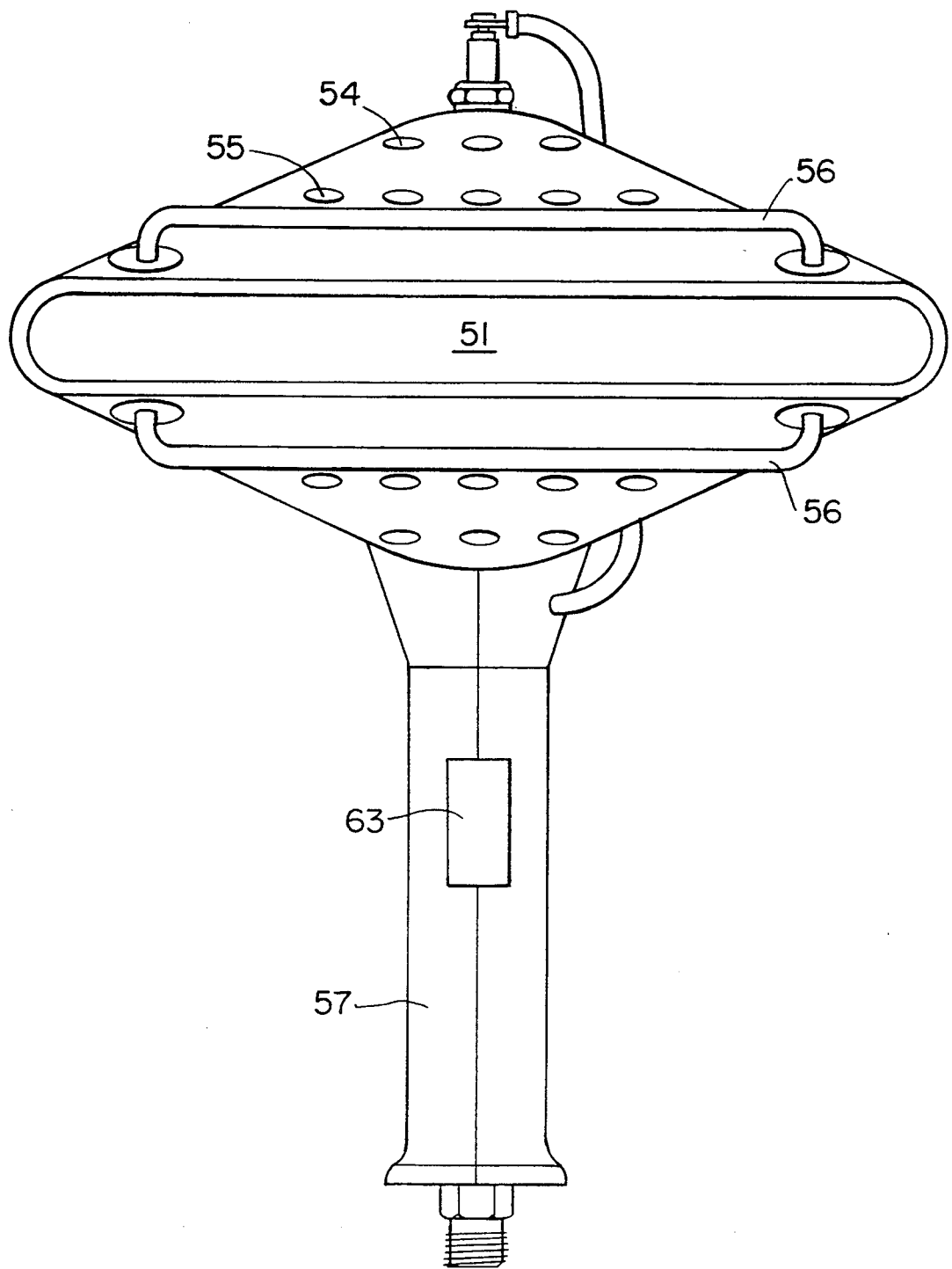
FIG. 5 is a front view of the heat gun of FIG. 3.
Figure 6:
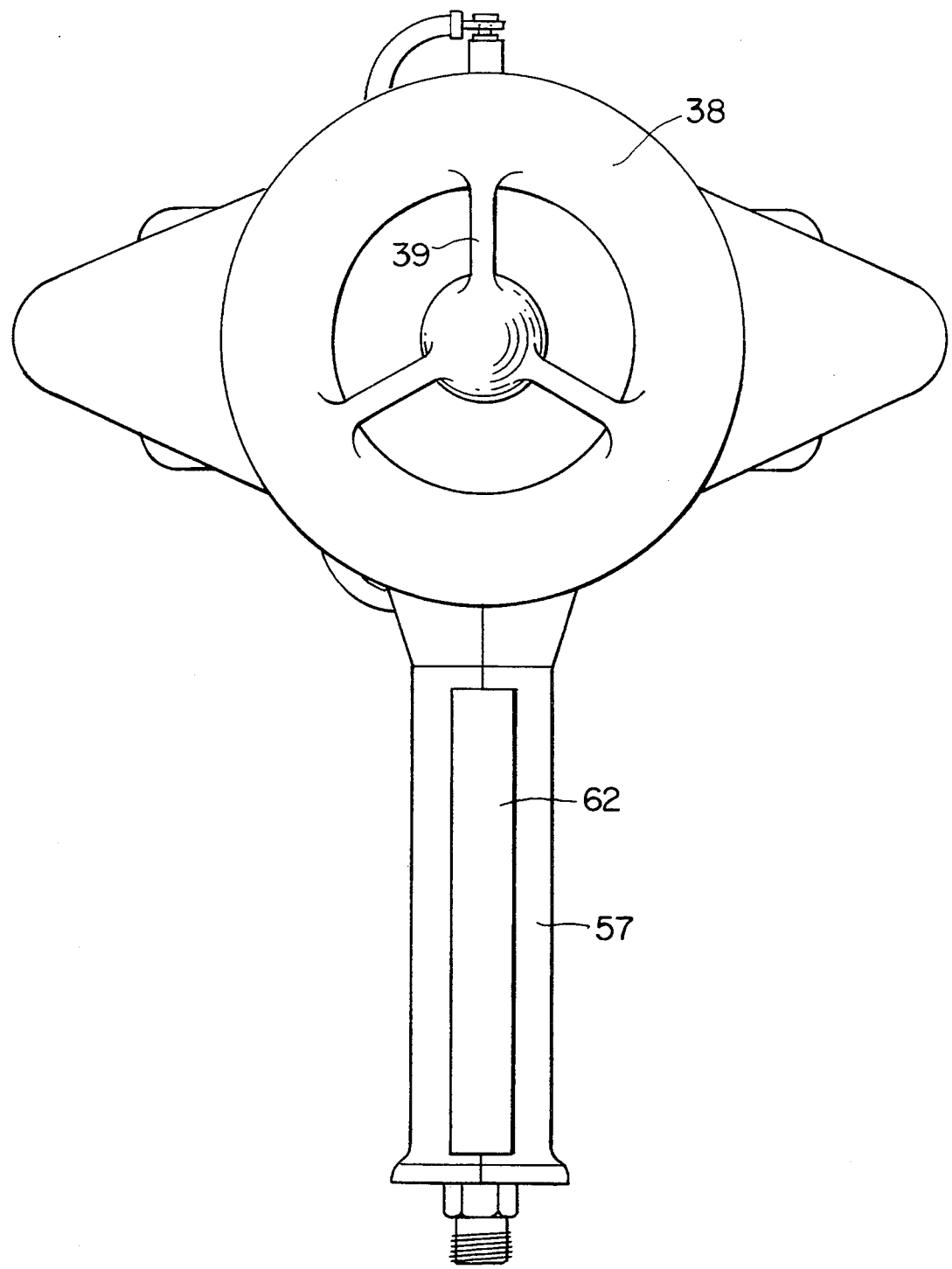
FIG. 6 is a rear view of the heat gun of FIG. 3.

FIG. 1 shows that exhaust gases from the combustion of fuel and air in a combustor 12 drive a turbine 14. The turbine extracts some of the power from those gases and employs it to drive a compressor 16 which supplies combustion air to the combustor 12. This arrangement requires that the turbine blades withstand the high temperatures of the exhaust gases.

Figure 2:
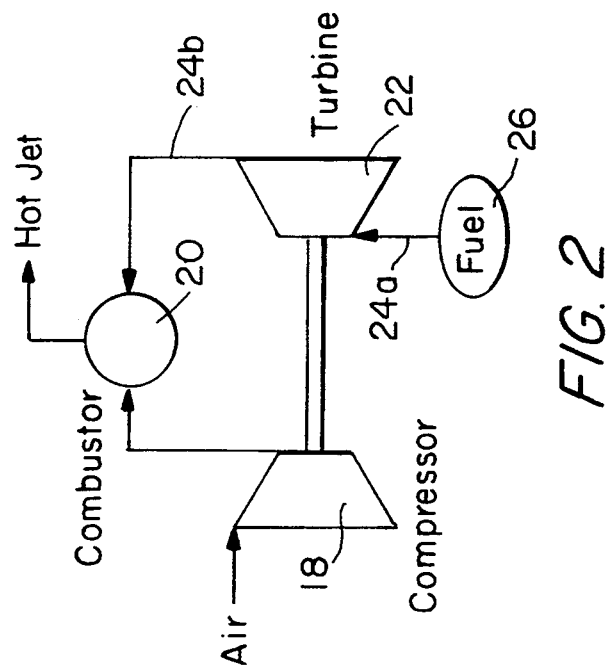
FIG. 2, is a schematic diagram of the preferred turbine cycle employed in the present invention.

However, we have recognized that superior performance and smaller size suitable to a heat gun can be achieved in a device that employs a cycle depicted schematically in FIG. 2. The cycle that our invention employs is like the conventional gas-turbine cycle in that it employs a compressor 18 to supply combustion air to a combustor 20 and in that the compressor 18 is driven by a turbine or other prime mover 22 that extracts power from the fluid flow and converts it to rotational, or "shaft," power. Rather than receiving its power from the combustor's exhaust gases, however, the turbine is interposed in a flow conduit 24a, 24b, that conducts the fuel from a pressurized fuel tank or other source 26 to the combustor 20.

Because such an arrangement can employ a compressor of the type that is driven by rotary power, it does not need to resort to jet pumps and the long passages that such jet pumps require for effective power transfer and pressure restoration. The turbine-compressor combination can be made several times as efficient as a jet pump, moreover, so power extracted from the fuel flow can be used to compress not only combustion air but also the typically much higher volume of cooling air. This eliminates the need for the second, exhaust-gas-driven jet pump that the jet-pump heat gun requires, and the resultant greater achievable pressure can produce a given mass flow through a gun outlet area that is greater than is achievable in jet-pump arrangements. A heat gun that employs the teachings of the present invention can therefore be made considerably smaller than a jet-pump arrangement of the same capacity yet avoid the need for the exotic materials and resultant cost that conventional turbine cycles require.

FIGS. 3-6 depict an improved heat gun that embodies the teachings of the present invention. Pressurized propane or some other pressurized gaseous fuel from an appropriate source such as a gas canister pressurized to 30 psig passes through a nozzle 31, which aims the resulting gas jet at turbine blades 32 mounted on a turbine wheel 33. The turbine wheel 33 is free to rotate on bearings 34 mounted on a stationary shaft 35. This arrangement is commonly known as an axial-flow turbine, and it extracts kinetic energy from the gas jet and converts it to shaft power of the turbine wheel. Although we prefer such an arrangement, it will be clear that the broader teachings of the present invention can be used in a gun that employs any prime mover that can extract power from the fuel flow and convert it to rotary power.

The turbine wheel 33 carries a set of fan blades 36, which are separated from the turbine blades 32 by a rim 37. As the turbine wheel spins, the fan blades 36 pump air A through a compressor inlet formed by an inlet shroud 38. The air flows past shaft-supporting struts 39, and air compressed by the action of the fan blades 36 is driven into a manifold 43 disposed downstream of the fan blades 36 and arranged to distribute the air in a manner that will be described below. Such a compressor arrangement is commonly known as an axial-flow compressor, and its function is to employ the shaft power to maintain as much pumping head as possible on the desired output air volume.

Meanwhile, the turbine discharge gas enters an annular gas plenum 40, at the downstream end of which is perforated wall 41 that presents enough flow resistance to cause the gas to assume a uniform radial distribution as it enters a mixing plenum 42, where it is joined by air driven through vents 44 in the manifold 43 by the pressure head that the compressor maintains. The resultant stoichiometric mixture of fuel and air enters a combustion region 46 through flame-holder passages 47, where it is initially ignited by a spark plug 48. The flame-holder passages 47 are so sized that the velocity of the air passing through them exceeds the velocity of flame propagation so that the flame in the combustion region 46 cannot propagate back into the mixing plenum 42.

In summary of the description so far, the fuel conduit 24a, 24b of FIG. 2 is represented in FIG. 3 by the nozzle 31 and annular plenum 40, while the prime mover 22 interposed in this conduit is represented in FIG. 3 by the turbine. The path from the compressor 18 to the combustor 20 of FIG. 2 includes vents 44. The heat gun of the present invention is thus similar to the Zagoroff jet-pump gun mentioned above in that the power in the expanding gaseous fuel on its way to the combustor is used to maintain the pressure head necessary to drive the combustion air into the combustion region with the necessary velocity.

As was stated above, however, the heat gun of the present invention extracts the power from the fuel-gas flow by means of a turbine (or similar prime mover for producing rotary power) rather than by means of a jet pump, so the combustion air can be pressurized by a type of compressor that can be driven by application of rotary power. The energy conversion can therefore be much more efficient than it is when a jet pump is employed, so enough power can be extracted from the fuel-gas flow to maintain a pressure head not only on the combustion air but also on the considerably higher volume of air employed to cool the combustion products.

Consequently, the combustion chamber includes a mixing duct 4 downstream of the combustion region 46, and the manifold 43 additionally includes vents 45 by which the compressor directs cooling air $A_2$ to the mixing duct 49. The resultant mixing with the combustion products cools them to the desired low temperature. The mixing is enhanced by turbulence that results from a spoiler disk 50 mounted on the manifold 43.

To maintain a cool exterior, the heat gun is mounted inside a shroud 52, which is cooled by air $A_3$ that the exhaust gases E aspirate through the annular passage between an output nozzle 51 and the shroud 52. The cooling air $A_3$ is admitted into the annular passage through air passages 54, 53, and 55, which are sized and arranged to maintain an even distribution of cooling air about the nozzle 21. As a further measure, the hot skin of the mixing duct 49 may be wrapped in thermal insulation.

For hand-held operation, a handle 57 may be mounted on the shroud 52 and house a gas-inlet fitting 58, a gas shut-off valve 59, a fuel line 60, a piezoelectric igniter 61, a trigger lever 62, and a safety catch 63.

Standoffs 56 are provided to prevent the nozzle 51 from being pressed directly against an object.

Since the illustrated embodiment enables air compression to be carried out by means of a blade-type compressor rather than a jet pump, the power is imparted to the air in a very short axial distance, whereas a jet pump requires a considerable axial distance to be effective. Moreover, since the turbine-compressor combination's much greater efficiency enables it to use the power from the expanding fuel gas to pressurize both the combustion air and the cooling air, it eliminates the need for a second jet pump downstream of the combustor and the additional length that such an additional jet pump requires. And the greater efficiency also results in development of a greater pressure head on all of the mixture of exhaust and cooling gas, so the area of the exit nozzle for a given flow velocity can be relatively large.

Together, these factors enable a unit that embodies the teachings of the present invention to be much smaller than a jet-pump unit of the same capacity. For example, we have designed a unit in accordance with the following construction parameters:

Overall Length: 11 in.
Overall Diameter: 5 in.
Gas Orifice Size: 0.150 in. ×0.040 in.
Outlet Nozzle Size: 0.5 in. ×8 in.
Turbine Diameter: 4 in.
Fan Diameter: 3.5 in.
Fuel Gas: Propane
Operating Pressure: 30 psig.
Output Temperature: 1250° F.
Turbine Speed: 20,000 rpm.
Heat capacity: 180 000 BTU/hr.
Turbine Efficiency: 40%
Fan Efficiency: 85%
Compression Ratio: 1.0034

It is clear from the foregoing design parameters that the present invention enables a large heating capacity to be achieved in a small package.

It will be apparent to those skilled in the art that the basic principle employed here can be employed in a wide range of embodiments. For example, although the illustrated embodiment employs an axial-flow turbine to extract the power, other prime movers such as a reaction turbine or a vaned or piston "air" motor could be employed instead to produce the desired rotary power. And the resultant rotary (shaft) power can be used to drive, for instance, a compressor that comprises a centrifugal- or mixed-flow fan. It is thus apparent that the teachings of the present invention constitute a significant advance in the art.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A gas heating gun having a handle and including:
   a source of unheated pressurized gas fuel;
   a single prime mover driven only by the expansion energy of the unheated pressurized gas;
   means forming an air compressor connected to and driven by the prime mover to compress air;
   means forming a combustion chamber located downstream from the prime mover and air compressor
   means for mixing the pressurized gas and compressed air and feeding the mixture to said combustion chamber; and
   means for igniting said mixture in said combustion chamber.

2. A gas heating gun as defined in claim 1 including a means forming a manifold between said air compressor and said combustion chamber.

3. A gas heating gun as defined in claim 2 including means forming a mixing duct connected to said combustion chamber and wherein the manifold has upstream vents that provide fluid communication with the combustion chamber upstream of an ignition region and downstream vents that provide fluid communication with the mixing duct.

4. A gas heating gun as defined in claim 3 wherein the upstream and downstream vents are so sized relative to each other as to direct more of the compressed air downstream of the ignition region than upstream thereof.

5. A gas heating gun as claimed in claim 3 wherein the mixing duct has an exhaust gas nozzle, the mixing duct being surrounded by a shroud, a passageway passing between the mixing duct and the shroud through which cooling air is aspirated by exhaust gases directed through the exhaust gas nozzle.

6. A gas heating gun as claimed in claim 1 wherein the prime mover comprises an axial-flow turbine.

7. A gas heating gun as defined in claim 1 wherein the compressor comprises an axial-flow compressor.

8. A gas heating gun as defined in claim 7 wherein the prime mover comprises an axial-flow turbine.

9. A gas heating gun as defined in claim 8 wherein the compressor and turbine have a common axis of rotation.

10. A gas heating gun as define in claim 9 wherein:
    a) the turbine and compressor respectively comprise turbine and fan blades; and
    b) the gas heating gun further includes:
       i. a stationary shaft;
       ii. a turbine wheel rotatably mounted on the shaft and mounting the fan blades which extend radially outward therefrom; and
       iii. a circular rim mounted on radially outward ends of the fan blades and mounting the turbine blades which extend radially outward therefrom.

11. A heating gun as claimed in claim 10 including means forming a manifold between said air compressor and said combustion chamber and means forming a mixing duct connected to said combustion chamber, the manifold having upstream vents that provide fluid communication with the combustion chamber upstream of an ignition region and downstream vents that provide fluid communication with the mixing duct.

12. A gas heating gun as claimed in claim 11 wherein the mixing duct has an exhaust gas nozzle, the mixing duct being surrounded by a shroud, a passageway passing between the mixing duct and the shroud through which cooling air is aspirated by exhaust gases directed through the exhaust gas nozzle.

13. A gas heating gun as claimed in claim 12 wherein the prime mover, air compressor and combustion chamber are enclosed within a shroud.

14. A gas heating gun as claimed in claim 1 wherein the prime mover, air compressor and combustor are enclosed within a shroud.

15. A heat gun comprising:
a source of unheated pressurized gas fuel;
a compressor comprising rotatable fan blades for driving air into a manifold of said compressor;
a circular rim mounted on radially outward ends of the fan blades;
a single turbine comprising turbine blades extending radially outward from the circular rim, the turbine being driven only by the unheated pressurized gas fuel and driving the fan blades;
means forming a combustion chamber located downstream from the turbine blades and in communication with a mixing duct having an exhaust nozzle;
upstream vents through the compressor manifold for directing pressurized air into communication with pressurized gas fuel upstream of an ignition region in the combustion chamber;
downstream vents through the compressor manifold for directing compressed air into the combustion chamber to mix with combustion products; and
a shroud, surrounding the combustion chamber and mixing duct and forming a passageway therebetween through which air is aspirated by the exhaust gases directed through the exhaust nozzle.

16. A method of heating air comprising:
driving a prime mover with pressurized gas fuel;
compressing air in an air compressor driven by the prime mover;
supplying the pressurized gas fuel mixed with compressed air from the compressor to a combustion chamber and igniting the mixture;
mixing additional air compressed by the compressor with combustion products from the combustion chamber, and directing said additional air and combustion products to a mixing duct; and
aspirating air through a shroud about said mixing duct by means of exhaust gases directed through an exhaust gas nozzle from said mixing duct.

17. A gas heating gun as defined in claim 3 including a flame holder in said combustion chamber.

18. A gas heating gun as claimed in claim 17 wherein the mixing duct has an exhaust gas nozzle, the mixing duct being surrounded by a shroud, a passageway passing between the mixing duct and the shroud through which cooling air is aspirated by exhaust gases directed through the exhaust nozzle.

* * * * *